Patented Mar. 28, 1939

2,152,613

UNITED STATES PATENT OFFICE 2,152,613

ACID INDOLEPHENYLMETHANE DYESTUFFS

Paul Wolff and Wilhelm Werner, Frankfort-on-the-Main, Germany, assignors to General Aniline Works, Inc., New York, N. Y., a corporation of Delaware No Drawing. Application November 26, 1935, Serial No. 51,679. In Germany November 27, 1934

2 Claims. (Cl. 260—319)

The present invention relates to acid indolephenylmethane dyestuffs.

We have found that acid triphenlymethane dyestuffs of very good properties of fastness and clear tints may be made by condensing an indole which contains in 1-position an alkyl group, for instance, a methyl- or ethyl group and in 2-position an alkyl group, for instance, methyl or ethyl group, or a phenyl group and in 3-position a para-chloro- or para-akloxy-benzoyl radical, with a secondary or tertiary aromatic amine, including those of the heterocyclic series, then causing the para-chlorine atom or the para-alkoxy-group respectively of the condensation product to react with a primary aromatic amine which contains an alkoxy-group, for instance, the methoxy or ethoxy group, in para-position to the amino-group, by which operation hydrogen halide or the corresponding alcohol is set free, and finally sulfonating the product obtained. It is also possible first to sulfonate the primary condensation product and subsequently to cause it to react with the primary aromatic amine which contains an alkoxy-group in para-position.

The indoles substituted in 1-, 2-, and 3-position used as parent materials are easily obtainable by causing to react the reaction product from an arylide of a benzoic acid with phosphorus oxychloride, with an indole substituted in 1- and 2-position and treating the condensation product with a dilute acid. Thereby the arylide radical is split off with formation of, for instance, an indolylphenylketone.

The products obtainable according to the present process are new dyestuffs of the triphenylmethane series, for instance dyestuffs of the following probable formula are obtained:

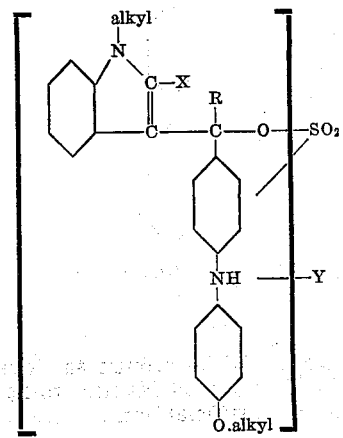

wherein
X means an alkyl or a phenyl group,
R means the radical, bound at a carbon atom, of an aromatic compound containing a secondary or tertiary nitrogen atom and
Y means that the compounds contain a further sulfonic acid group.

The following examples serve to illustrate the invention, but they are not intended to limit it thereto, the parts being by weight:

1. 34.6 parts of 1-methyl-2-phenyl-3-para-chlorobenzoyl-indole and 22.5 parts of ethyl-benzyl-meta-toluidine are condensed with each other in the presence of 30.7 parts of phosphorus oxychloride as usually, for instance, by melting at about 100° C. to 105° C. on the water-bath. The green dyestuff obtained, which is insoluble in water, is sulfonated and then melted with para-phenetidine at 120° C. to 125° C. There is obtained a dyestuff of the following probable formula:

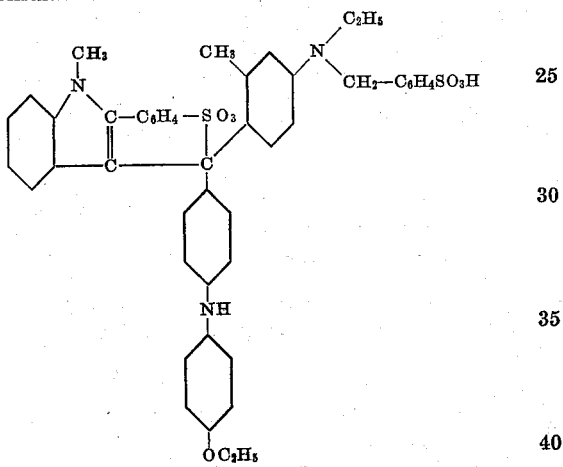

which in the form of its sodium salt dyes wool and silk reddish blue tints of very good fastness to light, great clearness and good color in artificial light.

The 1-methyl-2-phenyl-3-para-chlorobenzoyl-indole used as parent material is obtainable, as already mentioned in the opening paragraph, as follows:

92.4 parts of para-chlorobenzanilide, 82.8 parts of 1-methyl-2-phenylindole and 184.5 parts of phosphorus oxylchloride are heated to 100° C. to 105° C., while stirring, and this temperature is maintained for 5 hours. Thereupon, the mass is poured into hot dilute hydrochloric acid, while stirring, and the whole is maintained for several hours at water-bath temperature. After cooling, the whole is filtered and the solid matter is dried and recrystallized from alcohol and ligroin.

The 1-methyl-2-phenyl-3-para-chlorobenzoylindole thus obtained melts at 158.5° C.

2. By using in Example 1 instead of the ethyl-benzyl-meta-toluidine 21.1 parts of ethylbenzylaniline and otherwise proceeding as indicated in that example, a dyestuff is obtained which in the form of its sodium salt dyes wool and silk blue tints of a somewhat more reddish shade than that of the tints obtainable according to Example 1 and of similar good properties.

3. The condensation of 34.6 parts of 1-methyl-2-phenyl-3-para-methoxybenzoylindole with 20.0 parts of benzyl-ortho-toluidine in the presence of 30.7 parts of phosphorus oxychloride at about 100° C. to about 105° C., yields a basic green dyestuff which is insoluble in water. It is melted with para-phenetidine at 120° C. to 125° C. and then sulfonated. There is obtained a dyestuff of the following probable formula:

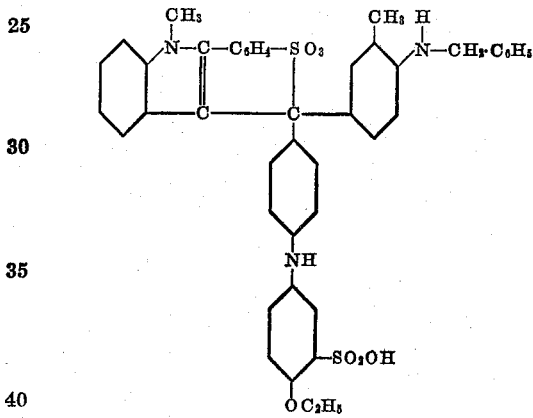

which in the form of its sodium salt dyes wool and silk violet tints of very good fastness to light, great clearness and good color in artificial light.

4. 28.3 parts of 1.2-dimethyl-3-para-chlorobenzoylindole, melting at 161.5° C. to 162° C., and 12.1 parts of dimethylaniline are condensed as above described and the condensation product which forms a basic bluish green dyestuff, insoluble in water, is melted with para-phenetidine at 120° C. to 125° C. The dyestuff obtained is sulfonated yielding a product which in the form of its sodium salt dyes wool and silk clear very reddish blue tints of very good fastness to light and good color in artificial light. The dyestuff has the following probable constitution:

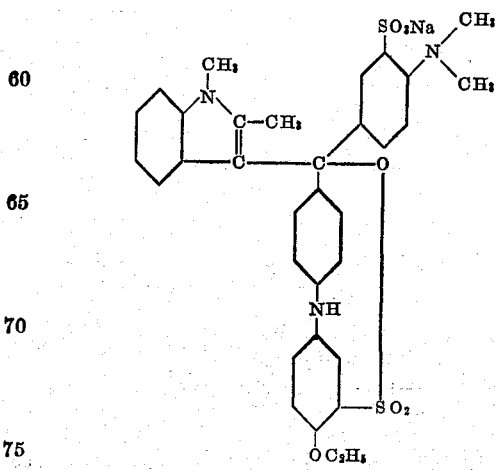

5. By substituting in Example 4 for the dimethylaniline therein used 20.0 parts of benzyl-ortho-toluidine and sulfonating the green dyestuff thus formed, there is obtained, after melting with para-anisidine at 120° C. to 125° C., a dyestuff which in the form of its sodium salt dyes wool and silk clear violet tints of very good fastness to light and very good color in artificial light.

6. 34.6 parts of 1-methyl-2-phenyl-3-para-chlorobenzoylindole are condensed by boiling under reflux with 19.6 parts of N-ethylcarbazole in 200 parts of benzene in the presence of 16 parts of phosphorous oxychloride. The green dyestuff obtained is melted with para-phenetidine as above described, and then sulfonated. There is thus obtained a dyestuff of the following probable constitution:

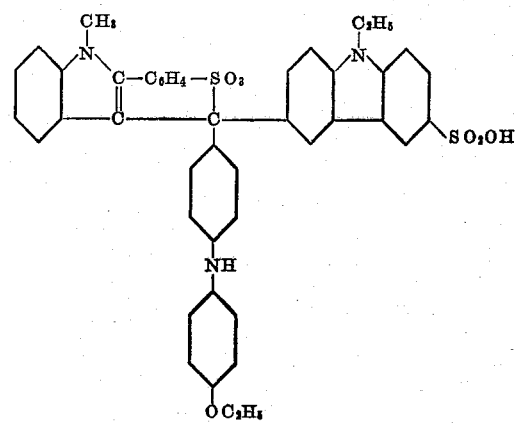

which in the form of its sodium salt dyes wool and silk reddish blue tints of very good fastness to light and of good color in artificial light.

7. By substituting for the N-ethylcarbazole used in Example 6 20.8 parts of 1-methyl-2-phenylindole and proceeding otherwise as indicated in that example a blue dyestuff of the following probable constitution is obtained:

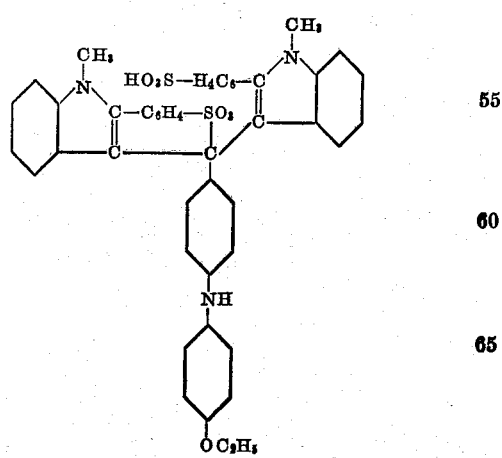

which in the form of its sodium salt dyes wool and silk tints of very food fastness to light and very good color in artificial light.

We claim:
1. The compound of the formula:

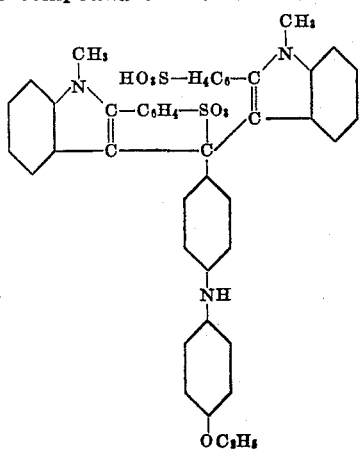

which in the form of its sodium salt dyes wool and silk tints of very good fastness to light and very good color in artificial light.

2. The process which comprises condensing an indole compound of the formula:

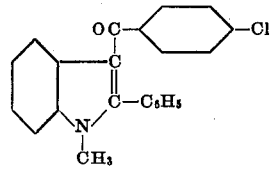

with 1-methyl-2-phenylindole, melting the product obtained with para-phenetidin and sulfonating the reaction product.

PAUL WOLFF.
WILHELM WERNER.